Nov. 15, 1927.

R. R. BALUT 1,648,889

PROCESS OF DYEING FUR

Filed May 13, 1926.

Inventor
Ramon R. Balut
By
Attorney

Patented Nov. 15, 1927.

1,648,889

UNITED STATES PATENT OFFICE.

RAMON R. BALUT, OF KINGSTON, PENNSYLVANIA.

PROCESS OF DYEING FUR.

Application filed May 13, 1926. Serial No. 108,853.

The present invention relates to a process for dyeing or coloring the hair of a pelt, and particularly to the provision of means whereby imitations may be made of the skins of fur-bearing animals of mottled or spotted appearance, such as the leopard, tiger, puma, jaguar and like animals of that species.

The skins of the fur bearing animals referred to, usually present an under color of yellow or tan effect, darker down the back and blending off to lighter shades toward the sides, while figures or spots are present thereon and which usually involve the blending of darker with light shadings of irregular outline. It is the primary object of the invention to provide simplified means whereby skins other than the natural skins of the animals mentioned, and of that class, may be colored, shaded, spotted or mottled to present close if not perfect imitations.

The process by which these advantageous results are attained may be better understood by reference to the accompanying drawings, wherein:

Fig. 4 is an enlarged fragmentary view illustrating a method of applying the colors, and.

As before stated, the hides or skins of animals such as the leopard, tiger, puma, jaguar, and others of the same species, including a tan or yellowish body color, darker down the middle of the back and blending off to lighter tones or shades to the sides or "belly" portions of the hide. The fur is spotted practically all over with figures of comparatively small size and irregular outline, and in some instances, such figures may take the form of stripes, blending from darker to lighter shades. The spotting or striping is usually of irregular outline, so that no particular line of demarcation can be placed at the juncture of the dark with the light or with the dark and the lighter shades, either of the spots or with the body color of the hide.

Figure 1:
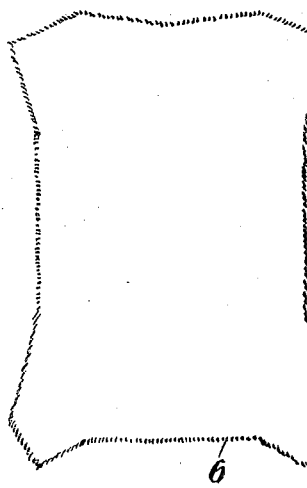
Fig. 1 is a plan view of a skin or pelt as it appears prior to the steps of the process.

In accordance with the present invention a properly prepared pelt or skin 6, shown at Fig. 1 of the drawing, is used, and may be a calf skin. The skin of the calf is quite tough and has fur of substantially the same length and quality of the fur of the animals to be imitated, and may very effectively be used in the production of the desired imitation. The skin, however, should contain white hair or hair of light yellow color. In instances where the natural color of the body coat is improper in the creation of a good imitation of the skins it is desired to simulate, the pelt will first be treated with a tan or yellowish dye so that the body coat will produce the appearance of a darker tan or yellowish color down the middle of the pelt and blending off toward the sides to lighter tones. This process is well known to furriers.

Analysis of the spots or figures upon the pelt of a leopard, puma, or jaguar skin, will disclose that usually two shades are involved. Many of the spots involve a dark annular or partially annular outline having a "core" or central part of lighter color, and these darker and lighter colors usually blend with each other and sometimes with the body coat in such manner as not to present a definite outline. Again, it frequently happens that spots of irregular configuration occur involving but one color; that is to say, such spots are sometimes dark and sometimes of the lighter shades.

Figure 2:
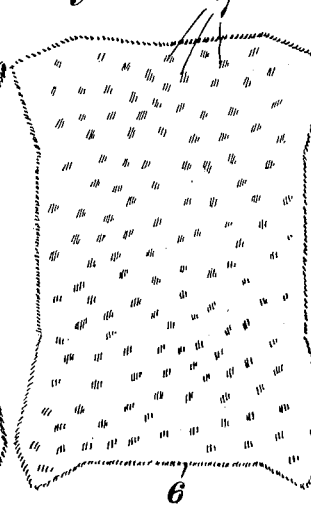
Fig. 2 is a similar view after the application of one step of the process.

According to the present process, those portions of the spots or figures which are to represent or imitate the lighter spots of the finished product are first applied to the hair of the pelt. Fig. 2 of the drawing represents the general appearance of the hide after this step has been carried out, and the reference numeral 7 denotes several of the spots of the lighter shade. The dye used in the production of these spots or "cores" may be of any desired formula well known to furriers.

Figure 3:
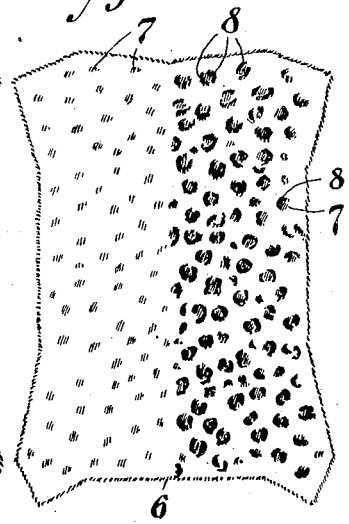
Fig. 3 is a similar view showing part of the second and part of the third steps of the process.

Such of the "cores" or lighter portions of the spots as are to be outlined or co-mingled with darker shades are surrounded thereby with black or very dark dye represented at 8 in Fig. 3 of the drawing. This darker spotting is produced by the employment of a dye or coloring considerably deeper in shade or tone than that of the spots 7, and such portions are laid or applied to the fur next adjacent to the first applied spots in a manner nearest simulating the spots of a genuine skin.

Figure 4:
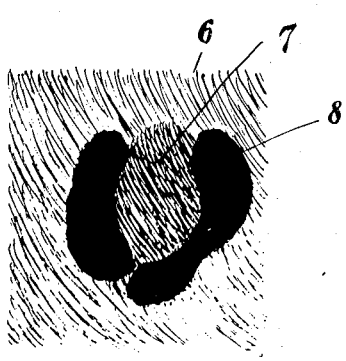
Figure 5:
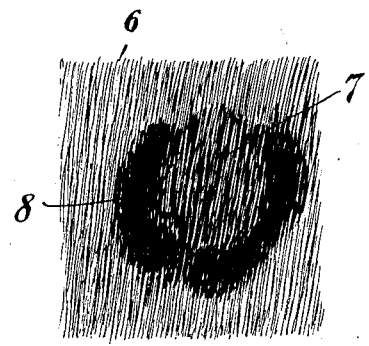
Fig. 5 is a view similar to Fig. 4 and illustrating the effect produced by applying the colors in a manner embraced by the invention.

As the spots or figures of the leopard skin, for instance, are usually of irregular outline, it is essential that the coloring spots be applied to the hair of the calf skin in such manner that the outlining of the finished design will not be too bold, both as respects the lighter and darker shades of the spot as well as the body color of the fur. To overcome such objection, and to insure proper coloring of the hairs from one end to the other, the spots of both the light and darker shades are applied with the hair moved out of its normal position. In Fig. 4 of the drawing there is an illustration of this step of the process, while in Fig. 5 the same design is shown substantially as it will appear when the hair is released and allowed to fall in its natural position.

By applying the dyes in this manner, those of the hairs embodying the design or spot are properly colored from end to end, and when the hair is released and allowed to fall back into its natural position, some of the hairs of the pelt next adjacent to the design will overlap or commingle with those of the color part of the design, whereby the distinct outline of the dye application is diffused or permitted to blend with the next adjacent furs of the pelt.

The process herein described may be carried out either by hand or by stenciling or roller process, and no claim is made to any specific devices by which the finished article is produced.

Having thus described my invention I claim:

1. A process whereby a hair covered pelt may be dyed to imitate a pelt of a fur-bearing animal which has, in its natural state, figures embodying a color tone shading off to a lighter color or to white, comprising the application to the fur at proper positions of a dye of comparatively light color and applying a darker dye to the fur so that the darker shade will present the appearance of blending into the lighter.

2. A process whereby a hair covered pelt may be dyed to imitate a pelt of a fur-bearing animal which has, in its natural state, figures embodying a color tone shading off to a lighter color or to white, comprising the application to the fur at proper intervals of a dye of comparatively light color, and applying a darker dye to the fur next adjacent to said lighter dye so that the darker shade will present the appearance of blending into the lighter.

3. A process whereby a hair covered pelt may be dyed to imitate a pelt of a fur-bearing animal which has, in its natural state, figures embodying a color tone shading off to a lighter color or to white, and comprising the application to the fur at proper intervals and successively of dyes of light and dark shades respectively juxtaposed so as to present the appearance of the darker blending into the lighter shades.

4. A process whereby a hair covered pelt may be dyed to imitate a pelt of a fur-bearing animal which has, in its natural state, figures of irregular shape and of mottled appearance and embodying color tones blending from dark to light shades; consisting of applying dark and light dyes at proper places on the pelt and in proper relation to each other while the hair thereof is moved out of its natural position.

In testimony whereof I affix my signature.

RAMON R. BALUT.